(12) United States Patent
Larson et al.

(10) Patent No.: US 7,195,272 B2
(45) Date of Patent: Mar. 27, 2007

(54) FRONT-AXLE SPRING PIVOT SUSPENSION AND STEERING APPARATUS

(75) Inventors: James W. Larson, Happy Valley, OR (US); Marlin J. Toews, Kelowna (CA); Bruce W. Mabbett, Kelowna (CA)

(73) Assignee: Freightliner LLC, Portland, OR (US)

( * ) Notice: Subject to any disclaimer, the term of this patent is extended or adjusted under 35 U.S.C. 154(b) by 286 days.

(21) Appl. No.: 10/813,912

(22) Filed: Mar. 26, 2004

(65) Prior Publication Data

US 2004/0245739 A1 Dec. 9, 2004

Related U.S. Application Data

(60) Provisional application No. 60/461,472, filed on Apr. 8, 2003, provisional application No. 60/477,627, filed on Jun. 10, 2003.

(51) Int. Cl.
*B60G 5/00* (2006.01)

(52) U.S. Cl. .......................................... 280/680; 267/52

(58) Field of Classification Search ................ 280/682, 280/677, 686, 680, 124.175, 124.17, 124.153, 280/124.128
See application file for complete search history.

(56) References Cited

U.S. PATENT DOCUMENTS

| | | | |
|---|---|---|---|
| 1,416,797 A | 5/1922 | Deschamps | |
| 2,097,438 A * | 11/1937 | Best .................... | 280/124.128 |
| 2,624,593 A | 1/1953 | Stover | |
| 2,900,197 A | 8/1959 | Hutchens | |
| 2,988,352 A * | 6/1961 | Masser ......................... | 267/25 |
| 3,117,799 A * | 1/1964 | Behnke ....................... | 280/682 |
| 3,186,731 A * | 6/1965 | Fossard ...................... | 280/686 |
| 3,198,541 A | 8/1965 | Christenson et al. | |
| 3,204,977 A | 9/1965 | Eisenhauer et al. | |
| 3,378,277 A | 4/1968 | Gadd | |
| 3,499,660 A * | 3/1970 | Raidel ........................ | 280/682 |
| 3,504,929 A * | 4/1970 | King .......................... | 280/682 |
| 3,531,099 A * | 9/1970 | King .......................... | 267/186 |
| 3,586,308 A * | 6/1971 | King .......................... | 267/52 |
| 3,602,523 A | 8/1971 | Poulos | |
| 3,669,466 A | 6/1972 | Spence | |
| 3,826,328 A | 7/1974 | Sheppard | |
| 3,913,936 A | 10/1975 | Thomas | |
| 3,954,148 A | 5/1976 | Sheppard | |
| 4,033,606 A | 7/1977 | Ward et al. | |
| 4,344,642 A | 8/1982 | Goth | |
| 4,486,029 A | 12/1984 | Raidel | |
| 4,502,707 A | 3/1985 | Jable et al. | |
| 4,548,291 A | 10/1985 | Tanaka et al. | |

(Continued)

*Primary Examiner*—David R. Dunn
*Assistant Examiner*—Drew J. Brown
(74) *Attorney, Agent, or Firm*—Klarquist Sparkman LLP

(57) ABSTRACT

A vehicle suspension has axle end portions each pivotally coupled to an associated leaf spring and thereby to an associated supporting vehicle frame rail. Control rods are pivotally coupled to the axle at locations below the leaf spring pivots. Desirably, one of such control rods is pivoted to the axle at a location above the wheel axis and the other of such control rods is pivotally coupled to the axle at a location below the wheel axis. A steering mechanism for steering the steerable wheels of a tandem axle includes first and second steering gears mounted to a common frame rail and driven by a single mechanical coupling such as a T-miter box. These steering gears may control respective steering gears at the opposite side of the vehicle.

17 Claims, 13 Drawing Sheets

U.S. PATENT DOCUMENTS

| | | |
|---|---|---|
| 4,721,318 A | 1/1988 | Hase et al. |
| 4,821,830 A | 4/1989 | Tomada et al. |
| 4,878,556 A | 11/1989 | Wells |
| 4,907,814 A | 3/1990 | Foster |
| 4,941,671 A | 7/1990 | Ellingsen |
| 5,209,518 A * | 5/1993 | Heckenliable et al. ...... 280/680 |
| 5,230,399 A | 7/1993 | Plate |
| 5,230,528 A | 7/1993 | Van Raden et al. |
| 5,322,308 A | 6/1994 | Bishop |
| 5,346,247 A | 9/1994 | Snyder |
| 5,531,466 A | 7/1996 | Hayashi |
| 5,615,906 A | 4/1997 | Raidel, Sr. |
| 5,810,110 A | 9/1998 | Sheppard |
| 5,839,527 A | 11/1998 | Elser et al. |
| 5,860,661 A | 1/1999 | Boucher et al. |
| 6,055,853 A | 5/2000 | Roberts et al. |
| 6,095,563 A | 8/2000 | Bushek |
| 6,119,882 A | 9/2000 | Crook et al. |
| 6,135,470 A | 10/2000 | Dudding |
| 6,176,341 B1 | 1/2001 | Ansari |
| 6,186,266 B1 | 2/2001 | Marchant et al. |
| 6,224,069 B1 | 5/2001 | Chan |
| 6,357,768 B1 | 3/2002 | Chan et al. |
| 6,360,518 B1 | 3/2002 | Scott et al. |
| 6,364,333 B1 | 4/2002 | Atkinson |
| 6,375,203 B1 | 4/2002 | Warinner et al. |
| 6,390,485 B1 | 5/2002 | Cadden |

* cited by examiner

FRONT-AXLE SPRING PIVOT SUSPENSION AND STEERING APPARATUS

RELATED APPLICATION DATA

This application claims the benefit of U.S. provisional patent application No. 60/461,472, filed Apr. 8, 2003, entitled, "FRONT-AXLE SPRING PIVOT AND STEERING APPARATUS AND METHOD", by James W. Larson, Marlin Toews and Bruce Mabbett, and the benefit of U.S. provisional patent application No. 60/477,627, filed Jun. 10, 2003, entitled, "FRONT-AXLE SPRING PIVOT AND STEERING APPARATUS AND METHOD", by James W. Larson, Marlin Toews, and Bruce Mabbett, which are hereby incorporated by reference.

TECHNICAL FIELD

The disclosure relates to suspensions for front axles of vehicles having leaf springs with a pivot coupling to the suspended axle and to steering mechanisms for steerable wheels of front axles.

BACKGROUND

A number of front axle suspensions are known in which a leaf spring is pivotally coupled to a suspended axle. Examples include leaf spring suspension shown in U.S. Pat. Nos. 3,204,977; 3,602,523; 1,416,797; and 2,624,593. In addition, a number of hydraulic power steering systems exist for steerable wheels of vehicles. U.S. Pat. No. 3,826,328 shows an example using plural steering gears. These steering gears may each be coupled by a pitman arm to a drag link and then to a steering arm which is connected to a spindle assembly or knuckle of a steerable wheel. In this example, one or more master or controlling steering gears are disclosed with one or more controlled steering gears.

Although these mechanisms exist, there is a need for improved vehicle front axle suspensions and steering mechanisms.

SUMMARY

In accordance with certain embodiments, a vehicle suspension is provided for each end portion of a vehicle axle. Each said suspension desirably comprises a leaf spring having a central portion pivotally coupled to the axle and leaf spring forward and rearward end portions coupled to a frame rail to thereby suspend the axle end portion from the frame rail. First and second control rods have respective end portions pivotally coupled to the axle for pivoting about respective pivots located below the leaf spring pivot. Desirably, one of the control rods is pivotal about a pivot which is above a wheel axis about which a wheel rotatably supported by the axle end portion rotates. The other control rod desirably has an end portion coupled to the axle for pivoting about a pivot which is below the wheel axis. Alternatively, and although less desirable, these pivots may both be located above the wheel axis and below the leaf spring pivot. Opposite ends of the control rods are pivotally coupled to the associated frame rail and may be pivotally supported by a bracket projecting downwardly from the frame rail.

In an embodiment comprising tandem axles, intermediate brackets may project downwardly from the respective frame rails at locations between the forward and rearward axles of the tandem axles. These intermediate brackets may each support a tie member or suspension equalizer having a forward tie member end portion linked to the rear end portion of a front leaf spring and rearward tie member end portion linked to a forward end portion of a rear leaf spring. The rearward end portions of the rear leaf springs may be coupled to respective downwardly projecting rear bracket.

Unique coupling brackets may be utilized to pivotally couple central portions of the respective leaf springs to the associated axle end portions.

A steering mechanism desirably comprises first and second steering gears mounted to a first frame rail and driven by a mechanical coupling to steer the steerable wheels of tandem axles which are linked by steering linkage to the respective steering gears. The mechanical coupling desirably is a T-miter box having an input coupled to a steering wheel. The first and second steering gears are desirably mounted to the outboard side surface of the frame rail at a position no lower than the lower edge of the frame rail. The steering gears may be mounted to respective mounting brackets of the suspension with the mounting brackets being mounted to the frame rail. The first and second steering gears may control respective controlled steering gears carried by a second frame rail opposite to the first frame rail and steeringly connected by linkage to wheels at the side of the vehicle where the third and fourth steering gears are located. The first frame rail is desirably at the driver's side of the vehicle.

The present invention is directed toward novel and non-obvious features of the disclosure set forth herein by alone and in various combinations and subcombinations with one another. The invention is not limited to any specific embodiment described herein or to a specific combination or combinations of features except as set forth in the claims below.

DETAILED DESCRIPTION

The description proceeds with reference several illustrative embodiments. The invention is not limited to these specific embodiments. The invention is directed toward all novel and non-obvious combinations of elements and method acts described herein both alone and in subcombinations and combinations with one another.

Figure 1:
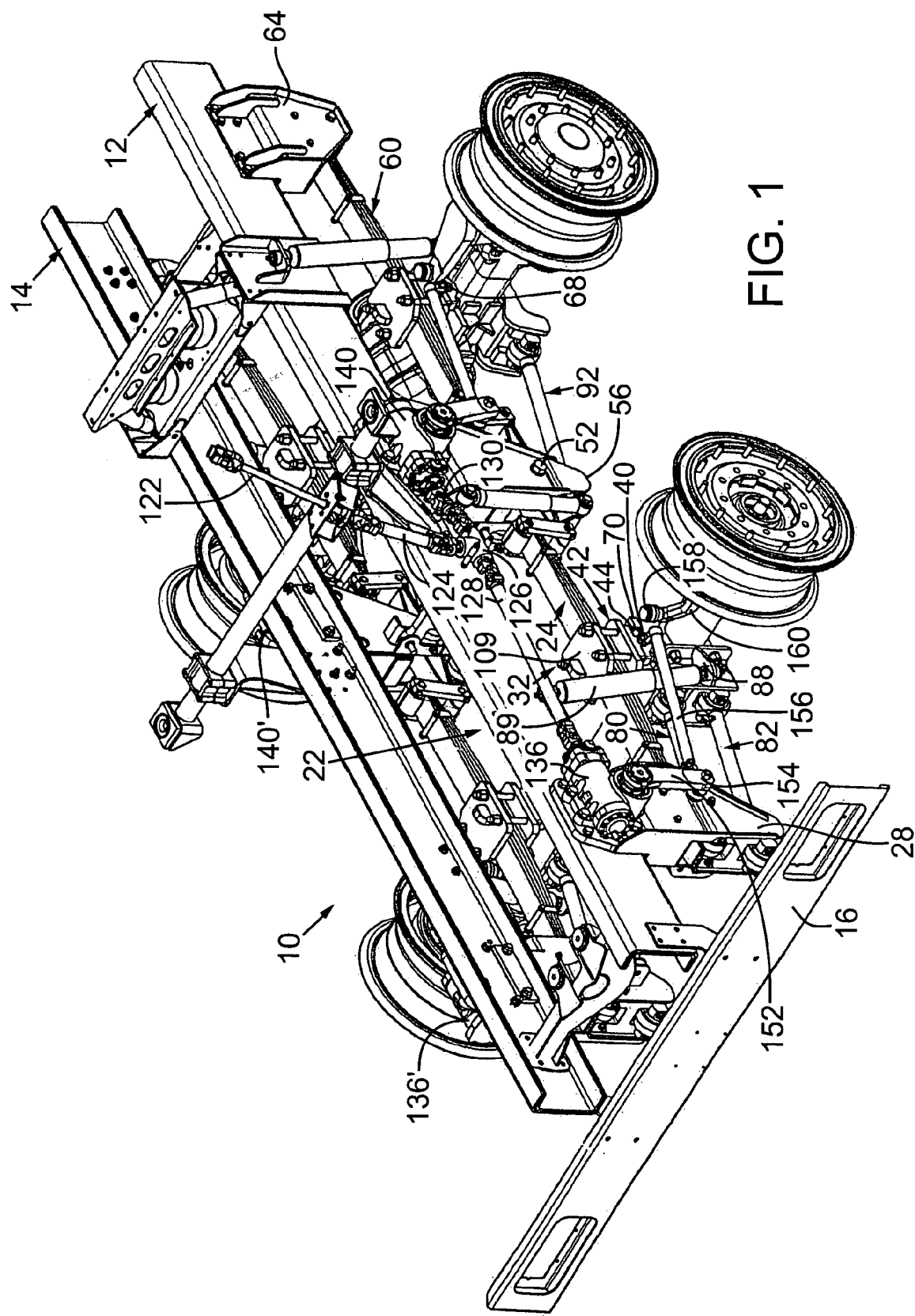
FIG. 1 is a perspective view of a tandem front axle pair suspended in accordance with one embodiment of a suspension and with each of the wheels being steerable by an exemplary embodiment of a steering mechanism.
Figure 2:
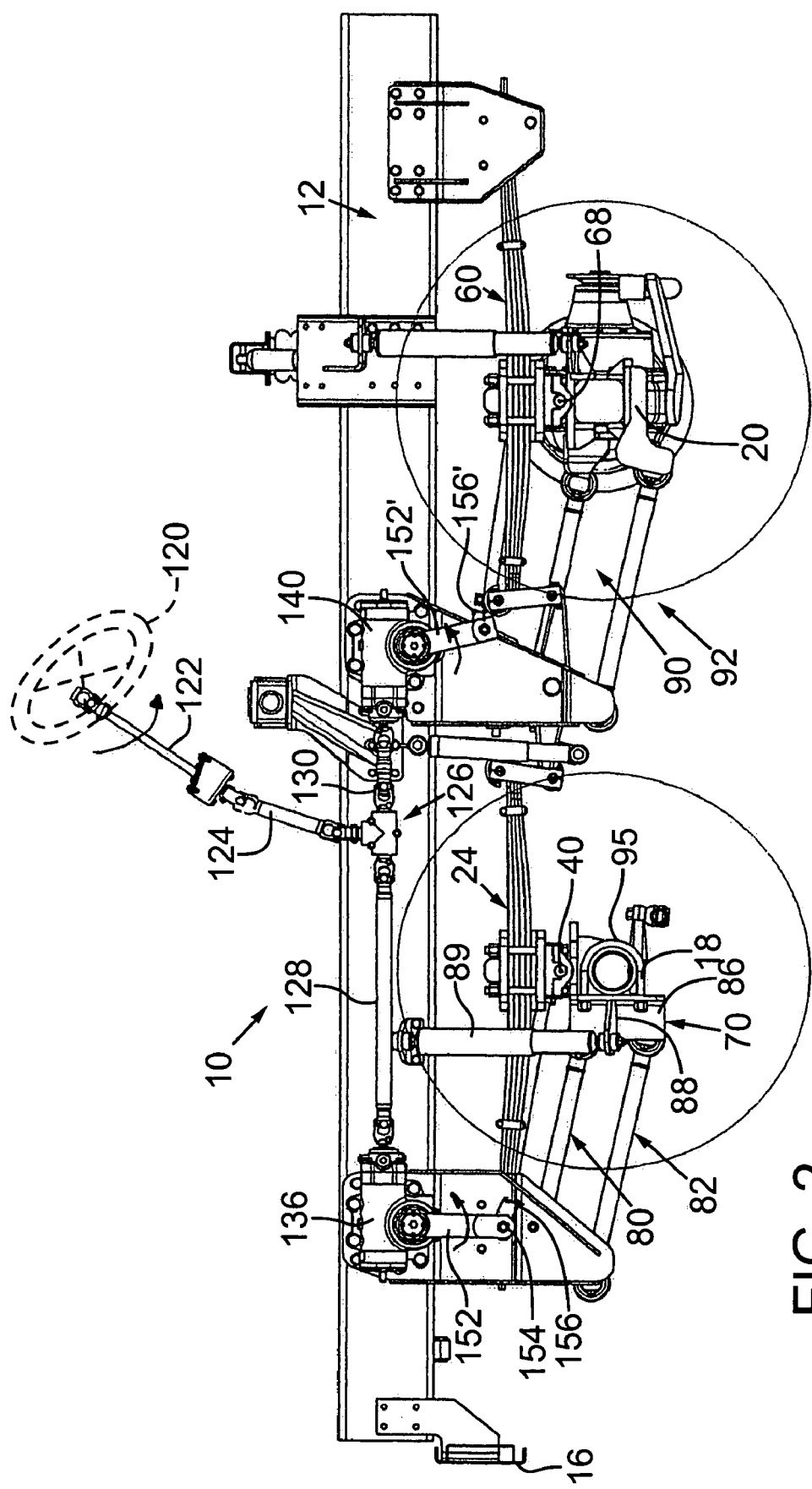
FIG. 2 is a side elevational view of the embodiment of FIG. 1 with portions of the steering mechanism removed for clarity.
Figure 3:
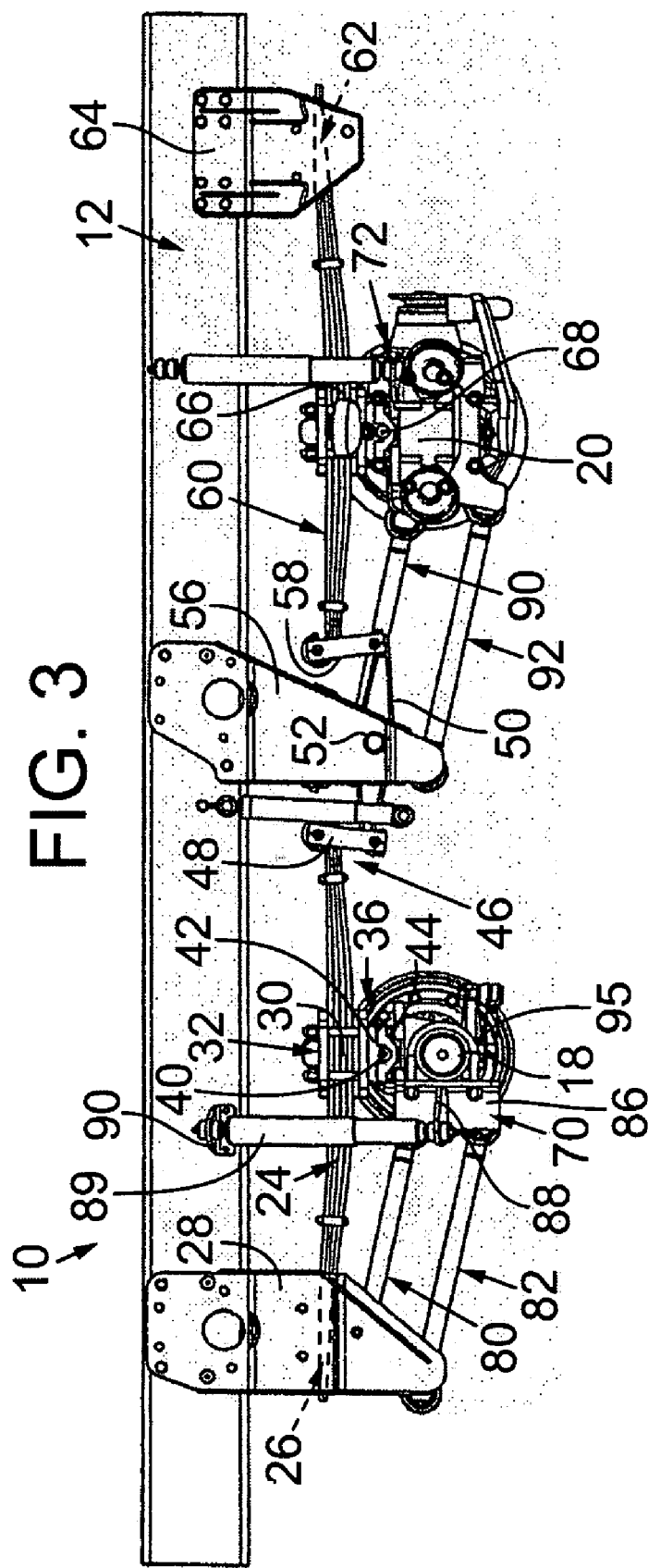
FIG. 3 is a side elevational view of the embodiment of FIG. 1 with the entire steering system removed for purposes of clarity.
Figure 3A:
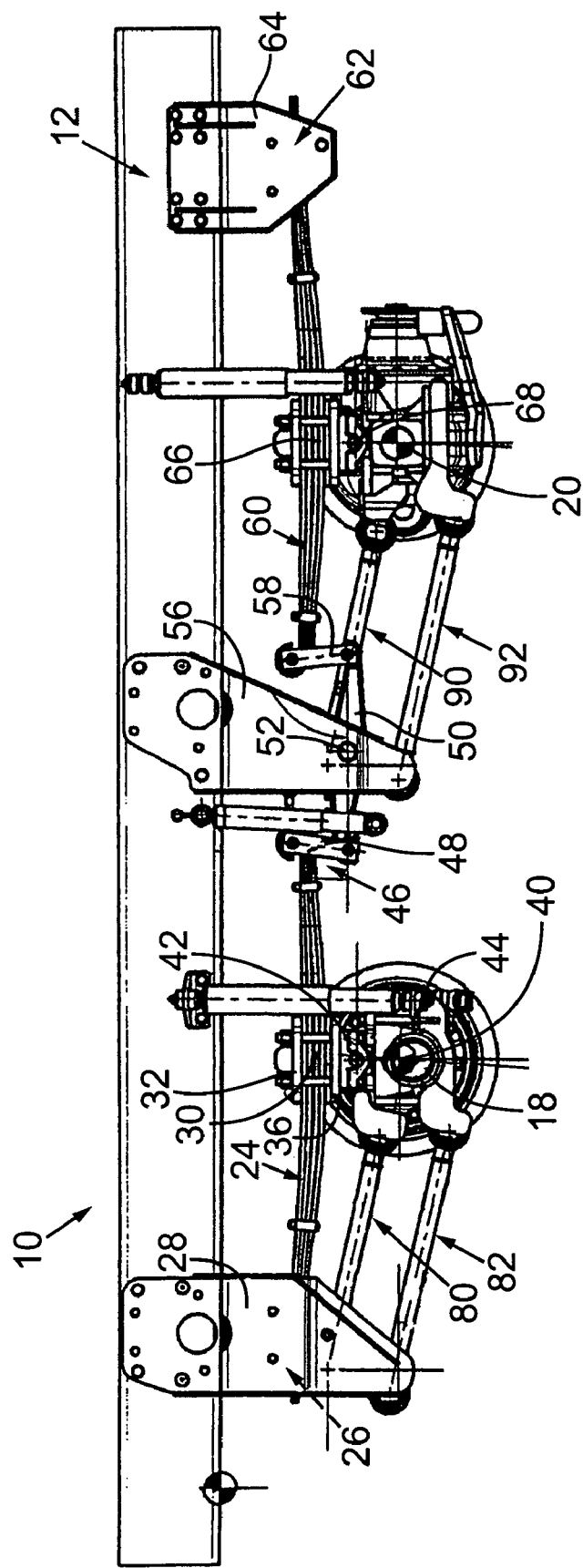
FIG. 3A is a side elevational view of an alternative embodiment to that shown in FIG. 3.

With reference to FIGS. 1, 2 and 3, a tandem axle steering and suspension system 10 is illustrated, although FIG. 3 is shown without the steering portion of the mechanism. FIG. 3A illustrates an alternative embodiment to that shown in FIG. 3. Components in FIG. 3A that correspond to similar components in FIG. 3 have been assigned the same numbers and will not be separately discussed. First and second parallel spaced apart frame rails 12,14 are shown with a bumper 16 supported at the forward ends of the frame rails.

With reference to FIG. 3, a front transversely extending axle 18 is shown together with a rear transversely extending axle 20. Axles 18 and 20 are a tandem pair of steerable axles located at the front of a vehicle. A space 22 is provided between frame rails 12,14 (FIG. 1) to accommodate an engine positioned therein.

With reference to FIG. 3, a suspension for the tandem axles 18,20 is shown at the driver's side (American-style vehicles) of the vehicle. A like construction may be used at the passenger side of the vehicle. In FIG. 3, a leaf spring 24, which may be comprised of one or more leaves, is supported at a first end portion 26 by a bracket 28 projecting downwardly from the frame rail 14. A central portion 30 of the leaf spring 24 is clamped by a clamping mechanism 32, which may comprise U-bolts or other clamps, and coupled to the axle 18. More specifically, a pivot mechanism 36 defines a transverse pivot 40 to pivotally couple the leaf spring assembly to the axle to permit pivoting of the spring about the axis of pivot 40. Mechanism 36 in one form comprises a pivot pin bore defining member coupled to the axle and a clamping member coupled to the spring with the pivot pin pivotally coupling the clamping member to the bore defining member to thereby pivotally couple the spring to the axle for pivoting about the axis of the pivot 40.

Figure 4:
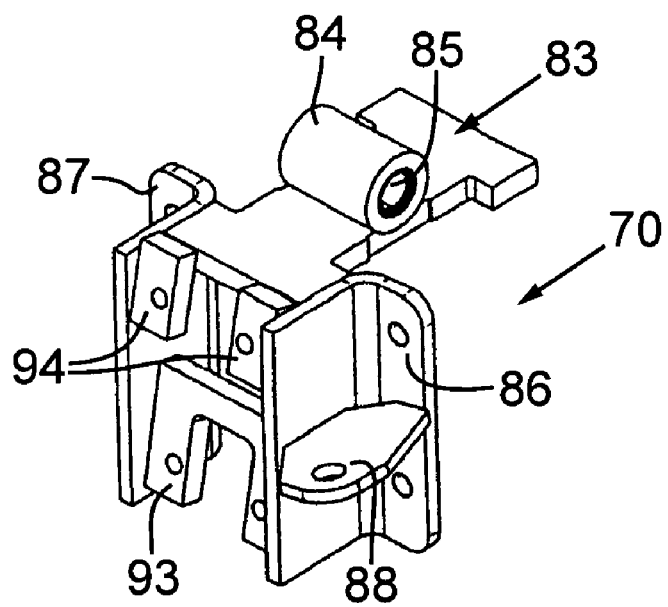
FIG. 4 is a perspective view of an exemplary bracket for use in pivotally coupling a leaf spring to an axle.

In one specific illustrated embodiment, pivot bore defining member comprises a bracket 70 (FIG. 4) comprising an axle overlaying portion such as a plate 83 having a lower surface adapted for overlying the upper surface of an axle. A pivot pin receiving bore defining member 84 is mounted to the upper surface of plate 83 and defines an internal bore 85 aligned with the pivot 40 when bracket 70 is mounted in place. The illustrated bracket further comprises first and second upright bracket side members which may be of an angular shape and which are designated as 86 and 87 in FIG. 4. The plate 83 extends between the upper edges of side members 86,87.

A shock absorbing supporting shelf 88 is mounted to the outer side member 86. Shelf 88 supports the lower end of a shock absorber 89 (FIG. 3). The upper end of the shock absorber is mounted by a bracket 90 to the exterior side surface of frame rail 14. With reference again to FIG. 4, bolt receiving flange members, such as an inverted U-shaped member 93 and upper members 94, are included in bracket 70. Fasteners, such as U-bolts (one being indicated at 95 in FIG. 3) wrap around the axle 18 and extend through respective openings in the members 86,87 for use in bolting bracket 70 to the axle with plate 83 overlaying the upper surface of the axle. The bracket 70 may be welded to the axle in addition to or instead of using fasteners such as U-bolts.

Figure 5:
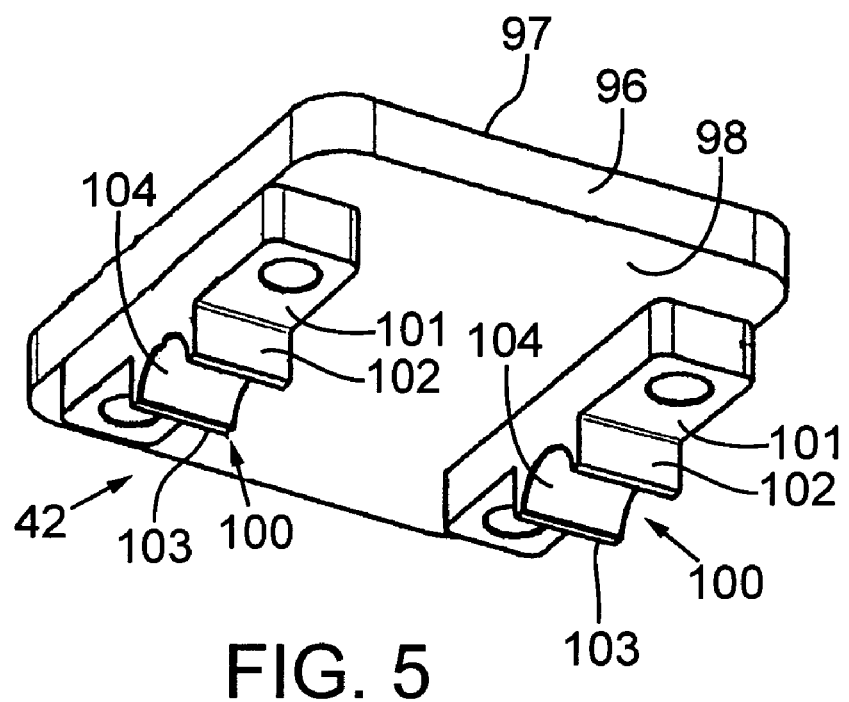
FIGS. 5 and 6 illustrate perspective views of embodiments of members for use in pivotally coupling a leaf spring to a pivot pin inserted into a pin receiving bore of the bracket embodiment of FIG. 4 (or FIG. 4A).
Figure 6:
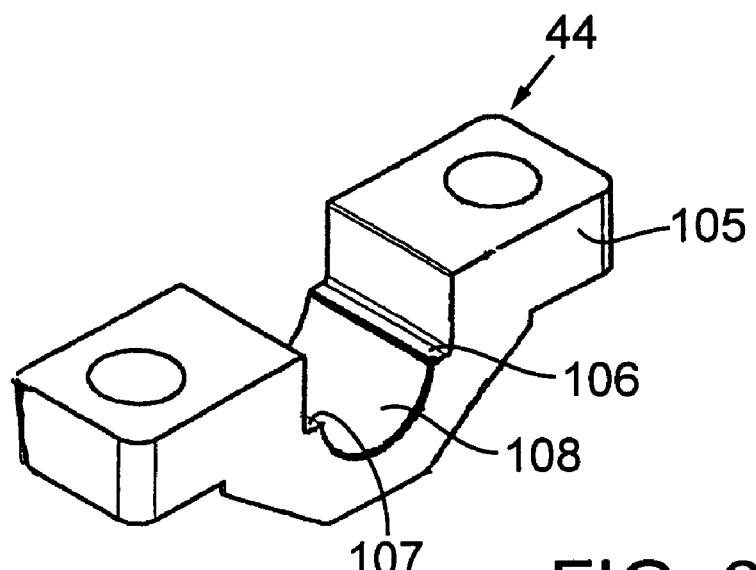

The illustrated form of mechanism 36 also includes an upper portion 42 (see FIG. 5) and one or more lower portions 44 (see FIG. 6) which in the form shown are clamped together and to the respective leaf spring and axle so as to define the pivot axis 40. The upper portion 42 comprises a body having a base 96 comprising an upper surface 97 and lower surface 98. Base 96 may be of a plate-like configuration. First and second spaced apart partial bore defining projections 100 extend or project downwardly from the undersurface 98 of base 96. Each member 100 has a mounting portion 101 from which downwardly projecting leg portions 102,103 project. The portions 101,102 and 103 define a section 104 of a pivot receiving bore which may be, for example, one hundred and eighty degrees of the bore. A respective lower portion 44 is associated with each of the members 100. The illustrated lower portion 44 comprises a body 105 defining respective leg engaging shelves 106,107. A portion of a pivot pin receiving bore 108 is defined between the shelves 106,107. When assembled, the leg 102 of portion 42 abuts one of the shelves 106,107 and the leg 103 abuts the other shelf. The partial bore defining members 104,108 together define a pivot pin receiving bore section with the combination of member 44 and member 42 defining two such spaced apart bore sections. These members are positioned relative to bracket 70 such that bore defining member 84 is positioned between the bore sections defined by members 42 and 44. These components are tied together when a pin is inserted through the bore portions defined by member 42 and member 44 and by member 84. That is, in this example, the member 44 is coupled to a pin for pivoting about axis 40 relative to the bracket 70 and thus relative to the axle.

With reference to FIG. 1, the clamping mechanism 32 shown in this figure comprises an upper clamping member 109, which may comprise a plate which is bolted or otherwise fastened to member 42 with the leaf spring 24 clamped between member 42 and member 109. Consequently, with this construction, the leaf spring also pivots about pivot 40 relative to the axle.

Figure 4A:
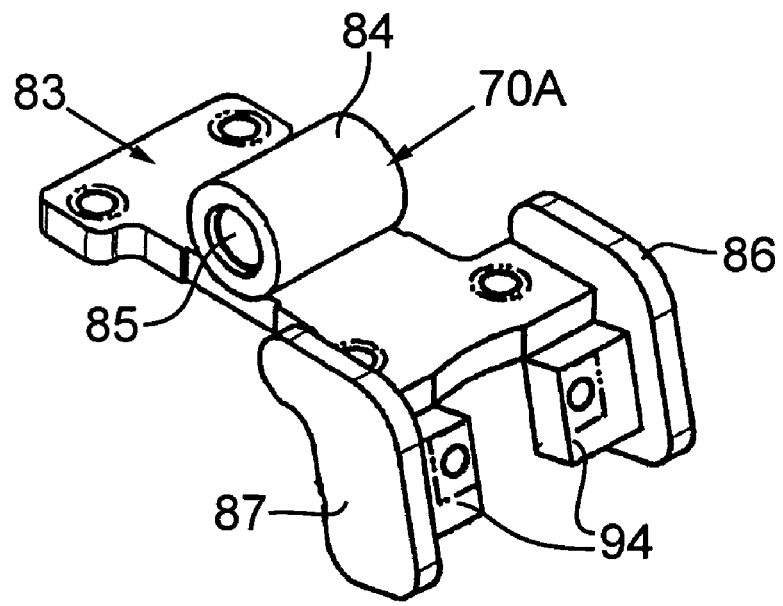
FIG. 4A is a perspective view of an alternative embodiment of the bracket of FIG. 4.

An alternative form of bracket 70 is indicated at 70A in FIG. 4A. Corresponding elements in FIG. 4A have been assigned the same number as those set forth in FIG. 4 and for this reason will not be discussed further. In both FIG. 4 and FIG. 4A, the illustrated plate 83 is of a generally I-shaped configuration with indented sides to accommodate the positioning of members 44 in place.

The rear end portion 46 (FIG. 3) of leaf spring 24 is pivotally coupled to an upper end portion of a link 48. The lower end portion of link 48 is pivoted to a forward end portion of a tie piece 50. The tie piece 50 is pivoted at an intermediate location 52 to a downwardly projecting bracket 56. The bracket 56 is mounted to frame rail 12 and extends downwardly from the frame rail. The rear end portion of tie 50 is pivoted to the lower end portion of a link 58. The forward end portion of a second leaf spring 60 is pivoted to the upper end portion of link 58. The rear portion of leaf spring 60 is coupled at 62 to a bracket 64 which projects downwardly from frame rail 14. A central portion of the leaf spring assembly 60 (indicated at 66), is clamped to the axle 20 with a pivot 68 being positioned between the leaf spring and axle. The components for clamping and pivoting leaf spring 60 to axle 20 may be the same as the components for pivoting leaf spring 24 to axle 18 and for this reason will not be described in detail. Alternatively, these brackets may take different configurations although desirably they perform the same functions. Desirably, an axle mounted bracket defines a pivot receiving bore with bore sections defined by members 42,44 being positioned on either side of the bracket defined pivot receiving bore with a pivot pin holding these components together.

Upper and lower parallel control rods 80,82 pivotally couple the axle 18 to the bracket 28. In this embodiment, the control rods 80,82 are pivoted to bracket 28 for pivoting about respective spaced apart pivots. Control rod 80 is pivotally coupled to axle 18 at a pivot location below the leaf spring pivot or pivot axis 40 and at a location which is also above the axis of axle 18, that is, the wheel axis about which carried by axle 18 pivots. Control rod 82 is pivotally coupled to the axle 18 at a pivot location below the pivot axis 40. Although this pivot location for control rod 82 may be above the wheel axis, this is less desirable than an embodiment where this pivot location is below the wheel axis such as shown in FIG. 3. The positions of rods 80,82 may be shifted from those shown in FIG. 3. However, it is desirable that the rear end of control rod 80 be pivoted to the axle at a location below the pivot 40. Desirably, the pivots for control rods 80,82 define a parallelogram or nearly a parallelogram. Also, the pivots for control rod 80 are desirably in a line parallel to a line containing the pivots of control rod 82. The suspensions for the other end portions of the axles in the tandem axle arrangement each desirably have a set of two control rods and a similarly arranged set of four control rod pivots.

Figure 7:
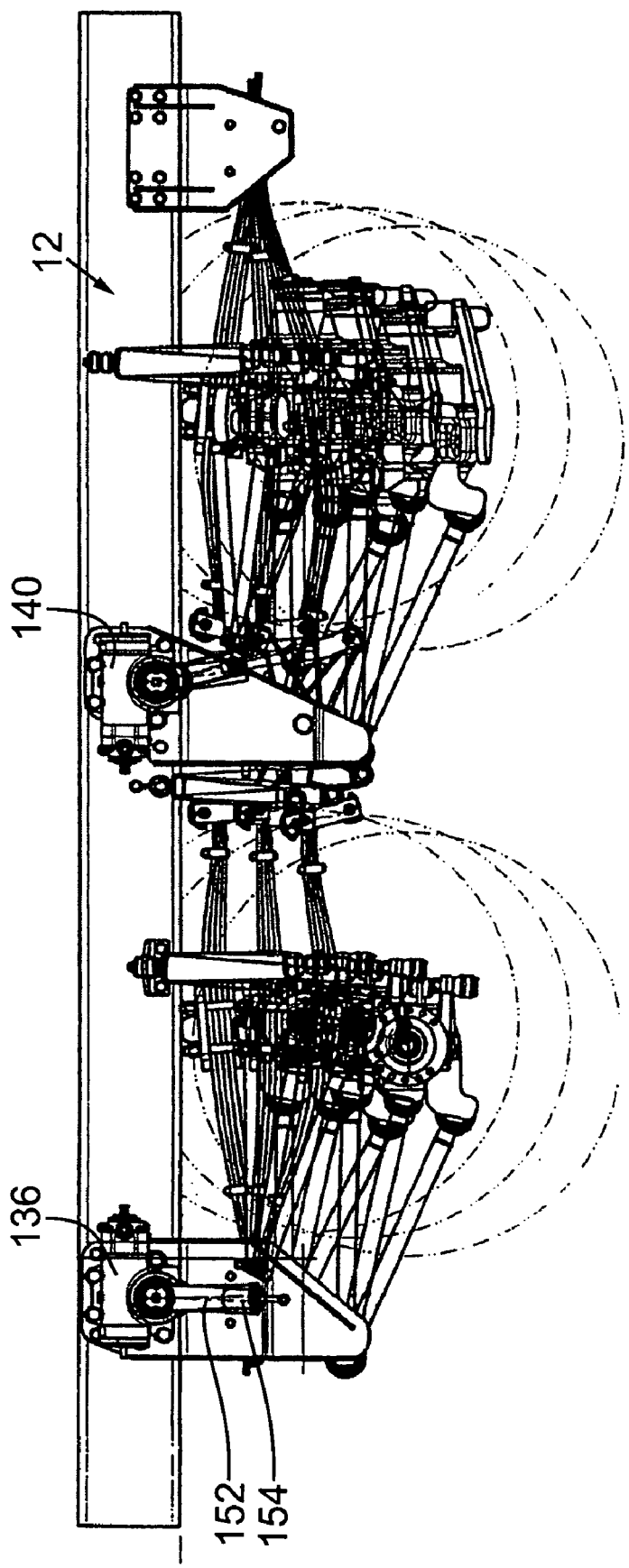
FIG. 7 illustrates a side elevational view of the suspension of FIG. 3A in various positions to which the suspension may shift during operation of the vehicle.

One form of bracket 70 (FIG. 4) also is useful for pivotally coupling an end portion of control rod 80 to axle 18 as is shown in FIG. 1. That is, mounting flanges 94 (FIG. 4) provide mounting points for supporting a transversely extending pin for pivoting the associated end portion of control rod 80 to bracket 70 and thus for pivotally coupling the rod 80 to the axle. In the same manner, mounting flanges 93 provide mounting points for supporting a transversely extending pin for pivoting the associated end portion of control rod 82 to bracket 70 and thus for pivotally coupling the rod 82 to the axle. In this disclosure, the term "couple" comprises direct connection and indirect connection through one or more other components. Again, variations of this bracket 70 are suitable. FIG. 4A illustrates an alternative version. Similar control rods 90,92 extend from bracket 56 to the axle 20. FIG. 7 illustrates various positions to which the suspension may shift during operation of the vehicle.

Although shown for a tandem steering axle configuration with the rear axle being driven, the suspension may be used for a single axle whether driven or not as well as for a tandem axle whether driven or not.

The steering mechanism is best understood with reference to FIGS. 8–14, 14A and 14B.

Figure 8:
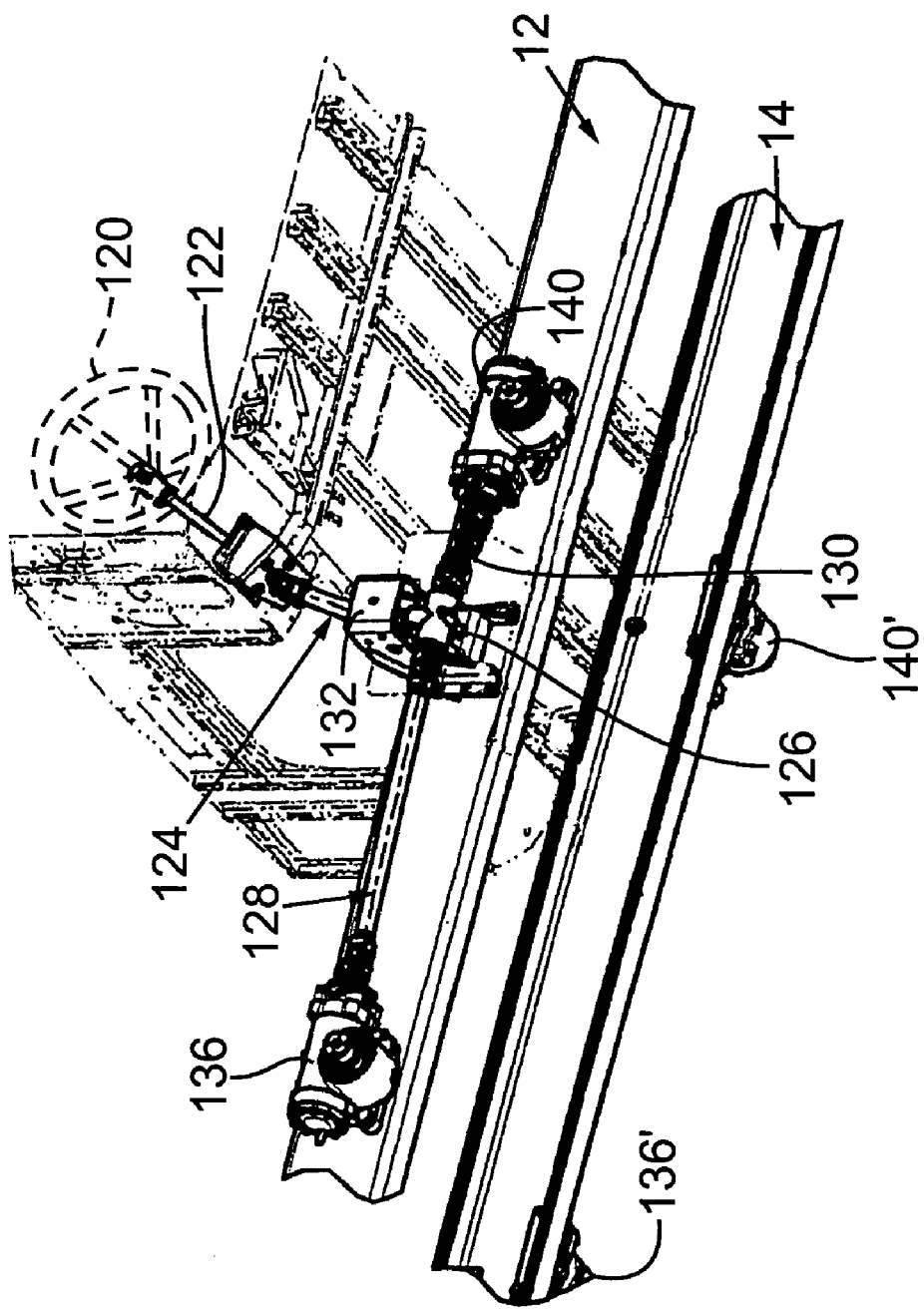
FIG. 8 illustrates a portion of an embodiment of a steering mechanism utilizing a single mechanical coupling, in this example a miter box, for controlling steering gears mounted to a frame rail and also illustrating the coupling of a steering wheel to the miter box.

In FIG. 8, a steering wheel is schematically represented by the number 120 and is shown coupled by shaft sections 122,124 to a T-miter box 126 having first and second output shafts 128,130. Shaft 128 is shown coupled by a universal joint to an output stub shaft 129 (FIG. 9) of the miter box and comprises a second universal joint coupled to a steering gear 136. Output 130 may comprise a stub shaft output 131 (FIG. 9) of miter box 126 coupled by plural universal joints to a second steering gear 140. T-miter boxes are conventional. For example, an example of a commercially available T-miter box is miter box Model 7548544 from R.H. Sheppard Company, Inc. of Hanover, Pa. In a miter box, the rotational input from a drive shaft is split into two outputs. For example, a drive shaft rotates to rotate an input gear which meshes with two output gears to produce the rotary outputs. The outputs of miter box 126 may rotate through the same angle in the appropriate directions to steer the wheels of the front and rear axles together (see FIG. 14). Thus, for example, when viewed from the front, turning the steering wheel in one direction causes the outputs 129,131 and 128,130 to rotate in a first direction (such as clockwise). If viewed from the rear, in this example, output 130 would appear to rotate counterclockwise. Also, one rotation of the input 124 may cause one rotation of outputs 128,130. A bracket 132 supports the T-miter box from the exterior surface of frame rail 12.

A first steering gear 136 is coupled to and controlled in response to an output shaft or output 128. A second steering gear 140 is coupled to and controlled in response to output 130. Steering gear 136 is used in controlling the steering of the front axle of the tandem axle pair. Steering gear 136 may also control a slave or hydraulically controlled steering gear 136' to provide power assist to the steering at the opposite end of the same axle that supports wheels steered by the operation of gear 136. The controlled steering gear 136' may alternatively and less desirably be positioned to provide power assist to the steering of the wheels at the opposite end of axle 20 from steering gear 140. A hydraulically controlled steering gear 140', which may be controlled by the operation of gear 140, provides power assist to the steering of an associated wheel at the opposite side of the vehicle from steering gear 140. Steering gear 140 is used in controlling the steering of the rear axle of the tandem axle pair. Linkage such as tie rods link the wheels at opposite sides of the vehicle so that they are steered together. Steering gears 136,136' may be controlled by a first hydraulic circuit and steering gears 140,140' (steering gear 140' being, for example, at the opposite end of the axle that supports wheels steered by the gear 140 or less desirably at the opposite end of the axle that supports the wheels steered by the steering gear 136) may desirably be controlled by a second hydraulic circuit.

Steering gears 136,140 are desirably mounted to the outboard surface of frame rail 12. Therefore, the steering gears do not interfere with the engine receiving space between the frame rails. Also, steering gears 136,140 are desirably positioned at or above the lower edge of the frame rail 12 so that they do not interfere with the ground clearance of the vehicle. Steering gears 136',140' are desirably mounted in the same manner to the outboard surface of frame rail 14.

Figure 10:
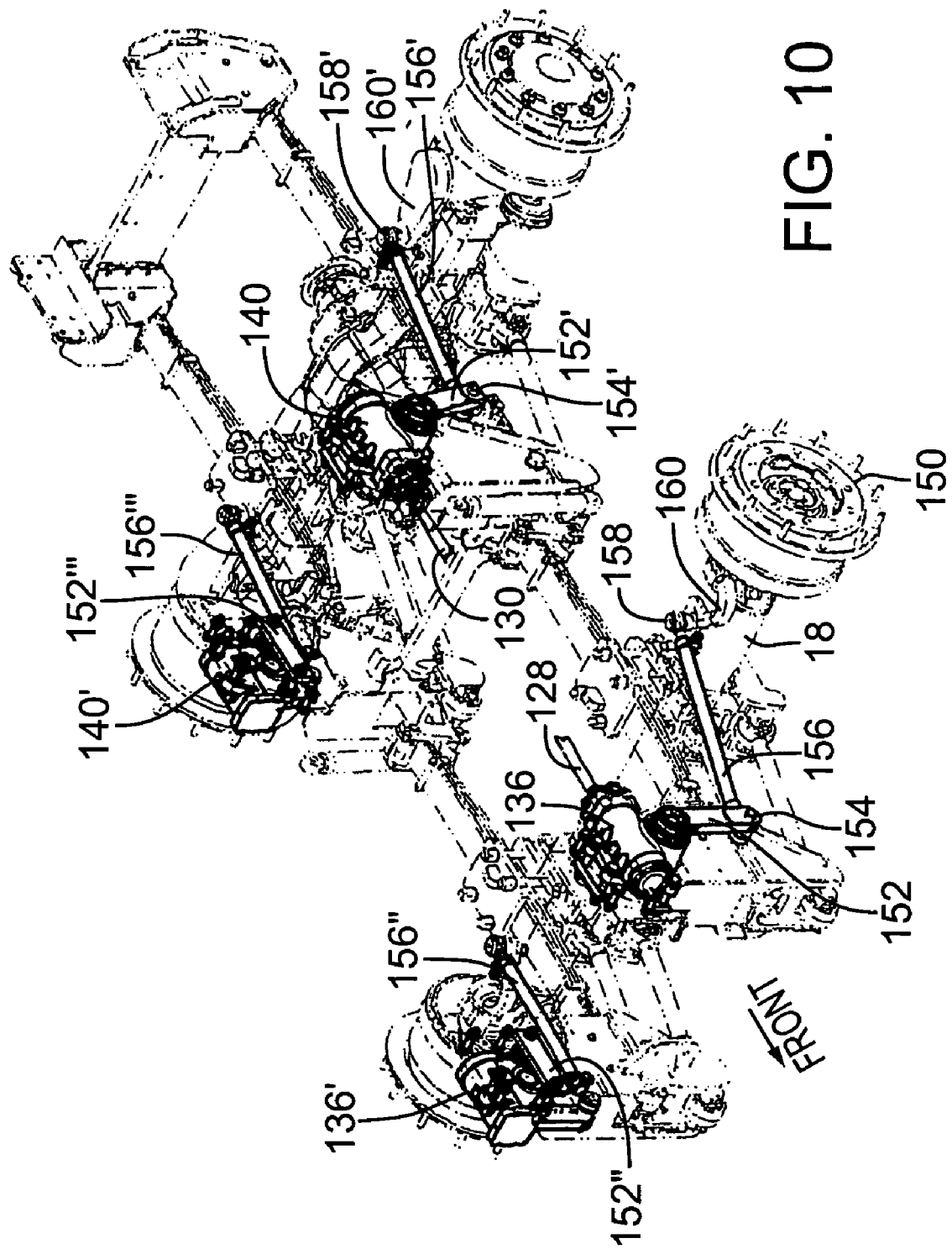
FIG. 10 is a perspective view of an embodiment similar to that shown in FIG. 1 and illustrating certain steering components of the embodiment in solid lines and other components of the vehicle and suspension system in dashed lines.

Thus, a single mechanical coupling is used to control and coordinate the timing of two separate steering gears. In addition to the controlled steering gear 136, the so-called "controlled" steering gear 136' is shown in FIG. 10 positioned at the passenger side of the vehicle. As previously mentioned, gear 136' is mounted to the outer exterior side surface of frame rail 14. The position of steering gear 136 controls the position of steering gear 136'. A single hydraulic circuit may contain both steering gear 136 and steering gear 136'.

A steering gear 140', which may be controlled by the position of steering gear 140, is located at the passenger side of the vehicle and desirably, as explained above, is mounted to the outboard side surface of frame rail 14. A second hydraulic circuit may be used for gears 140 and 140'. Thus, two separate hydraulic circuits may be used in this configuration, resulting in efficiencies in supplying hydraulic fluid to the steering gears 136, 136' and the steering gears 140,140' as each is supplied by their own hydraulic circuit. Note: A common supply may be used for hydraulic fluid to each of these circuits.

Figure 9:
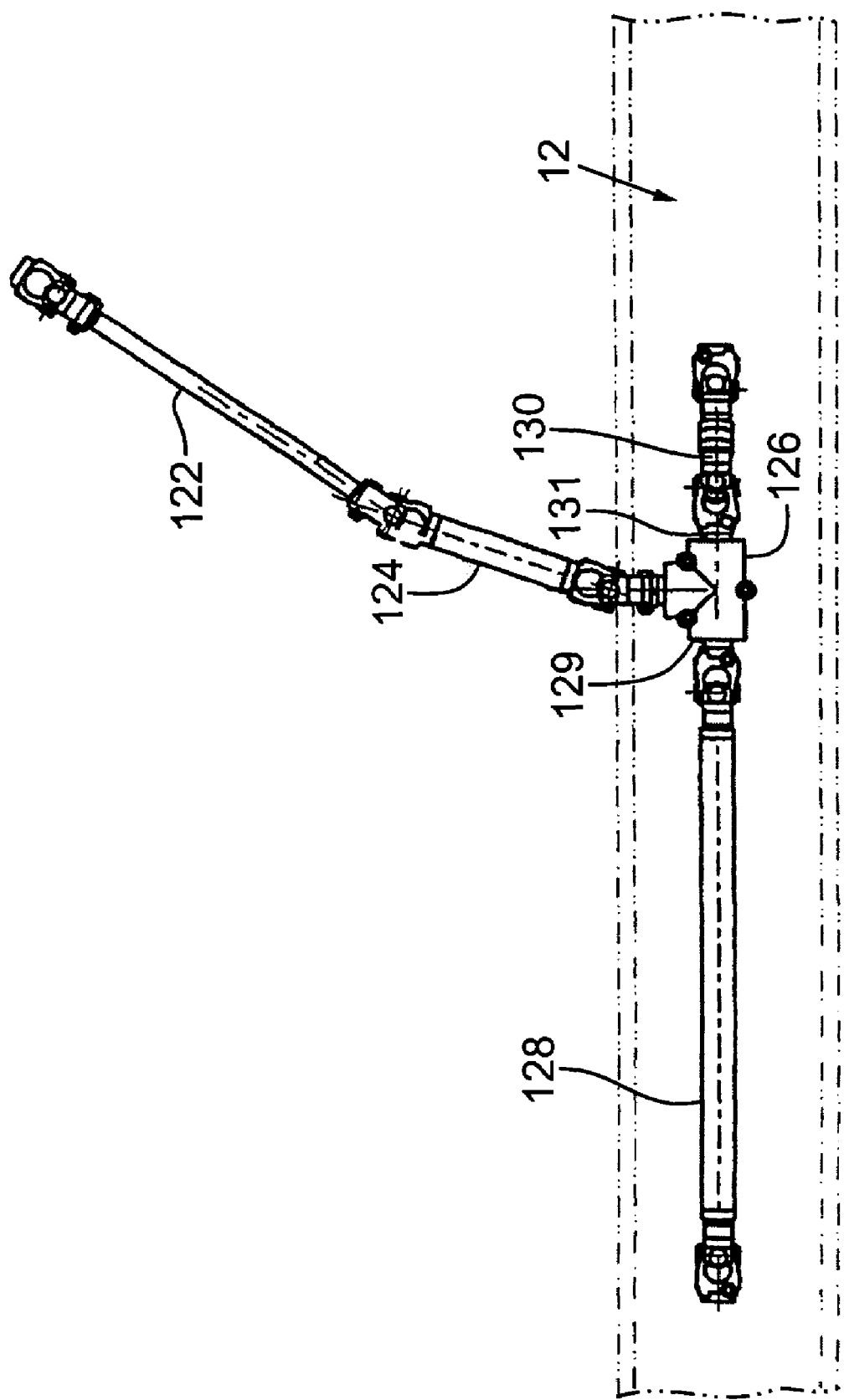
FIG. 9 illustrates selected components of the embodiment of FIG. 8 in greater detail.

FIG. 9 shows another view of linkage that may be used in the FIG. 8 embodiment.

Figure 11:
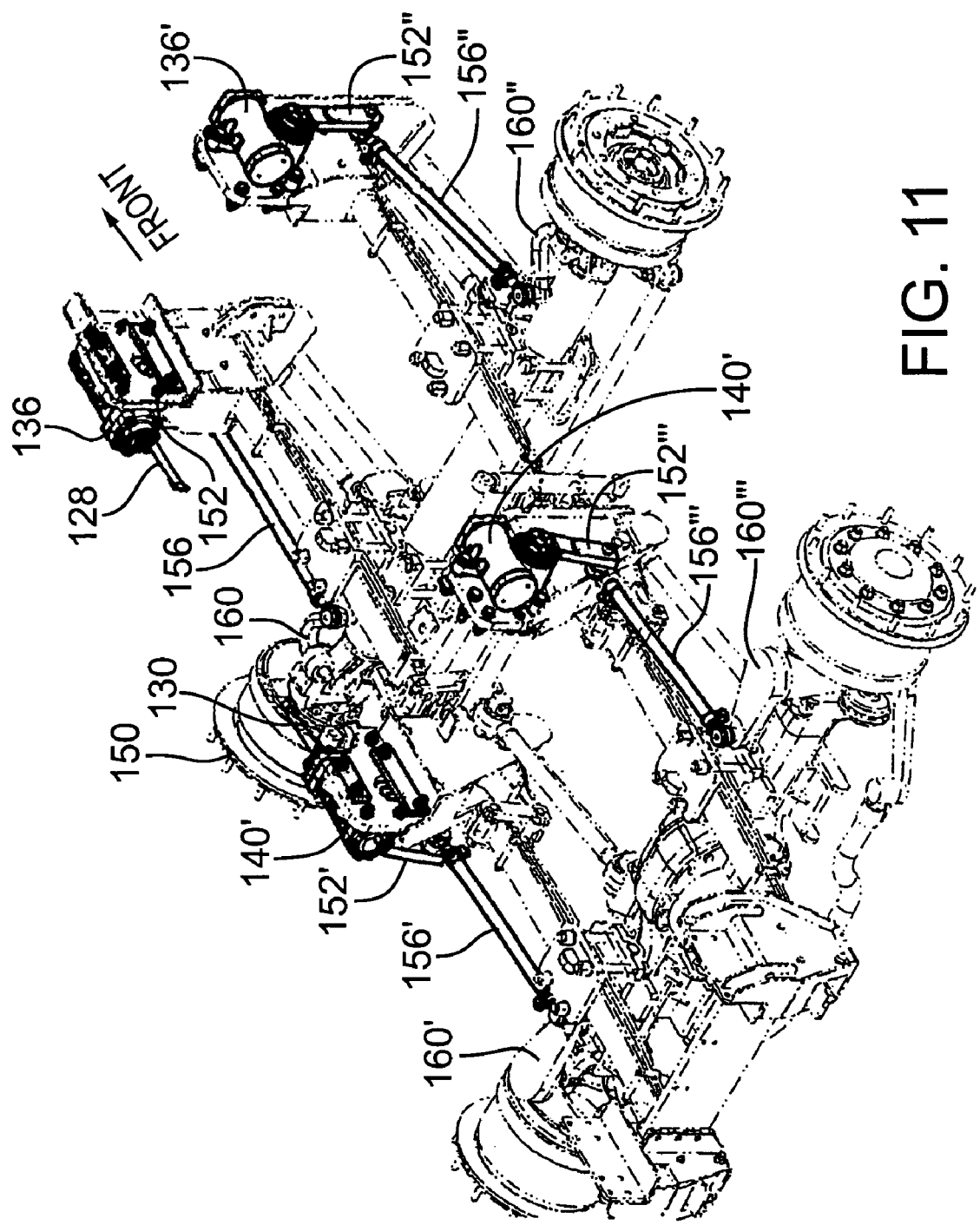
FIG. 11 is similar to FIG. 10 looking from the opposite side of the vehicle from that shown in FIG. 10.
Figure 12:
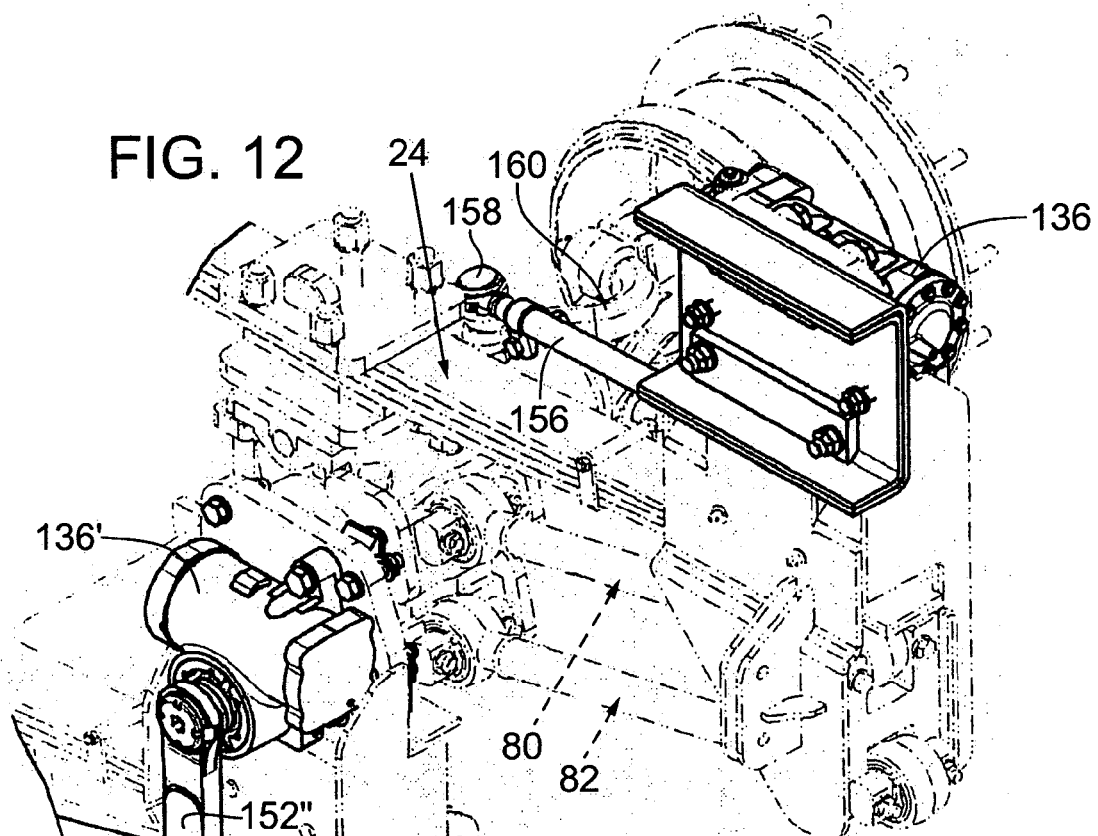
FIG. 12 illustrates certain components of the steering system of FIG. 10 in greater detail and also illustrates the cooperative relationship between the illustrated steering components and suspension components, the latter being shown in dashed lines.
Figure 13:
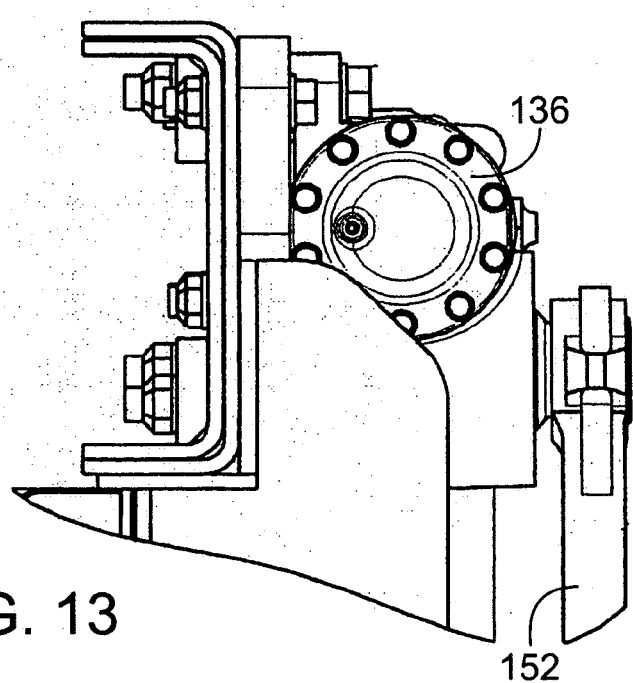
FIG. 13 is an end view of a portion of the vehicle shown in FIG. 12.

FIGS. 10 and 11 illustrate other exemplary steering components. Since these components are generally similar to one another, they will only be described in connection with the front left wheel 150 of FIG. 10. Specifically, a pitman arm 152 is driven by steering gear 136. A lower end portion 154 of the pitman arm is pivoted to a one end of a draglink 156. The opposite end of the draglink 156 is pivoted at 158 to a steering arm 160, which is rigidly connected to a knuckle on the axle 18. The pitman arm to drag link to steering arm to knuckle steering configuration is common. FIGS. 12 and 13 illustrate additional details of this construction. The similar components associated with steering gear 140 are indicated in FIG. 10 by the numbers 152',154', 156',158' and 160'. The number 152" indicates the pitman associated with gear 136', the number 156" indicates the associated drag link, and the number 160" indicates the associated steering arm. The respective numbers 152''', 156''' and 160''' indicate the pitman arm, the drag link, and the steering arm associated with steering gear 140.

Figure 14A:
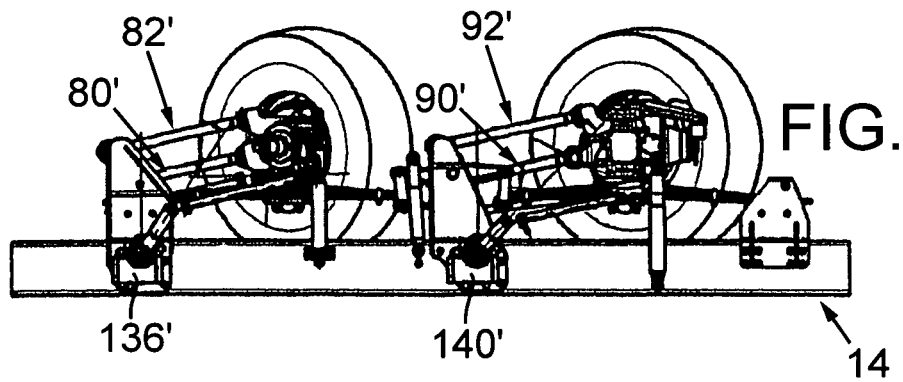
FIGS. 14, 14A and 14B illustrate respective side, top and opposite side views of the steering and suspension mechanism with the wheels shown in one steered position.
Figure 14:
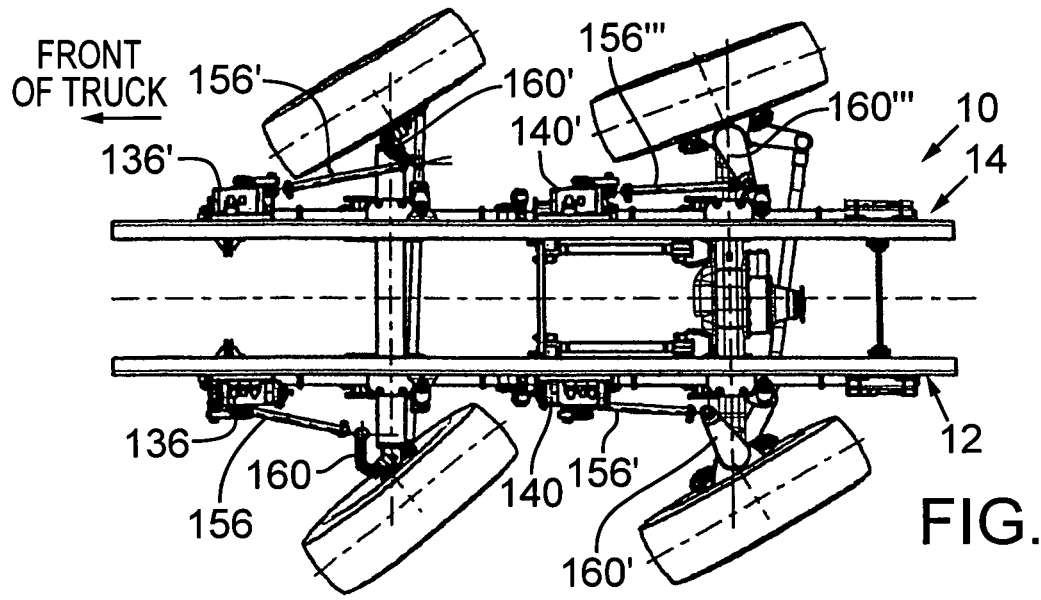
Figure 14B:
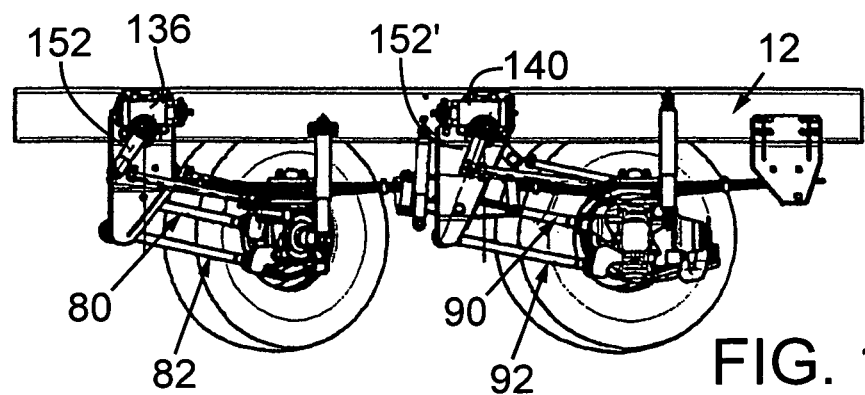

FIGS. 14, 14A and 14B illustrate respective side, top and side views of an embodiment of the steering and suspension mechanism with the wheels shown in one steered position.

In this description, the words include and including have the same meaning as comprise and comprising. In addition, the term "a" includes one or more. Thus, if two components are present, "a" component is also present.

Having illustrated and described the principles of our invention with reference to several embodiments, it should be apparent to those of ordinary skill in the art that these embodiments may be modified in arrangement and detail without departing from the inventive principles set forth in this disclosure. We claim as our invention all such modifications as fall within the scope and spirit of the following claims.

We claim:

1. A vehicle comprising:
first and second elongated spaced apart frame rails;
a front vehicle axle extending in a transverse direction relative to the frame rails, the front axle comprising first and second end portions;
a first suspension associated with the first end portion of the front axle and coupling the first end portion of the front axle to the first frame rail, the first suspension comprising a first leaf spring including a central portion overlying and pivotally coupled to the first end portion of the front axle for pivoting relative to the front axle about a first leaf spring pivot, the first leaf spring also including respective first forward and first rear leaf spring end portions coupled to the first frame rail, a first control rod having a first end portion pivotally coupled to the first end portion of the front axle for pivoting about a first pivot which is below the first leaf spring pivot, the first control rod having a second end portion pivotally coupled to the first frame rail for pivoting about a second pivot, and a second control rod having a first end portion pivotally coupled to the first end portion of the front axle for pivoting about a third pivot which is below the first pivot, the second end portion of the second control rod being pivotally coupled to the first frame rail for pivoting about a fourth pivot;
a second suspension associated with the second end portion of the front axle and coupling the second end portion of the front axle to the second frame rail, the second suspension comprising a second leaf spring including a central portion overlying and pivotally coupled to the second end portion of the front axle for pivoting relative to the front axle about a second leaf spring pivot, the second leaf spring also including respective second forward and second rear leaf spring end portions coupled to the second frame rail, a third control rod having a first end portion pivotally coupled to the second end portion of the front axle for pivoting about a fifth pivot which is below the second leaf spring pivot, the third control rod having a second end portion pivotally coupled to the respective second frame rail for pivoting about a sixth pivot, and a fourth control rod having a first end portion pivotally coupled to the second end portion of the front axle for pivoting about a seventh pivot which is below the fifth pivot, the second end portion of the fourth control rod being pivotally coupled to the second frame rail for pivoting about an eighth pivot.

2. A vehicle according to claim 1 wherein the first and fifth pivots are above a front wheel axis about which wheels supported by the front axle rotate and the third and seventh pivots are below the front wheel axis.

3. A vehicle according to claim 1 wherein the first suspension comprises a first forward suspension bracket coupled to the first frame rail at a location forwardly of the front axle, the first forward suspension bracket extending downwardly from the first frame rail, and wherein the second and fourth pivots are carried by the first forward suspension bracket, and wherein the second suspension comprises a second forward suspension bracket coupled to the second frame rail at a location forwardly of the front axle, the second forward suspension bracket extending downwardly from the second frame rail, and wherein the sixth and eighth pivots are carried by the second forward suspension bracket.

4. A vehicle according to claim 1 wherein the first suspension comprises a first axle mounting bracket having a first pivot pin receiving bore which is positioned above the first end portion of the front axle when the first axle mounting bracket is mounted to the first end portion of the front axle, the first pin receiving bore defining a transversely extending first leaf spring pivot, and wherein the second suspension comprises a second axle mounting bracket having a second pivot pin receiving bore which is positioned above the second end portion of the front axle when the second axle mounting bracket is mounted to the second end portion of the front axle, the second pin receiving bore defining a transversely extending second leaf spring pivot.

5. An apparatus according to claim 4 wherein the first axle mounting bracket comprises a first portion having a lower surface positioned at least in part over the first axle end portion and an upper surface supporting the first pivot pin receiving bore, the first axle mounting bracket also comprising first and second leg portions positioned forwardly of the front axle and carrying the first and third pivots; and wherein the second axle mounting bracket comprises a first portion having a lower surface positioned at least in part over the second axle end portion and an upper surface supporting the second pivot pin receiving bore, the second axle mounting bracket also comprising first and second leg portions positioned forwardly of the front axle and carrying the fifth and seventh pivots.

6. A vehicle comprising:

first and second elongated spaced apart frame rails;

a front vehicle axle extending in a transverse direction relative to the frame rails, the front axle comprising first and second end portions;

a first suspension associated with the first end portion of the front axle and coupling the first end portion of the front axle to the first frame rail, the first suspension comprising a first leaf spring including a central portion overlying and pivotally coupled to the first end portion of the front axle for pivoting relative to the front axle about a first leaf spring pivot, the first leaf spring also including respective first forward and first rear leaf spring end portions coupled to the first frame rail, a first control rod having a first end portion pivotally coupled to the first end portion of the front axle for pivoting about a first pivot which is below the first leaf spring pivot, the first control rod having a second end portion pivotally coupled to the first frame rail for pivoting about a second pivot, and a second control rod having a first end portion pivotally coupled to the first end portion of the front axle for pivoting about a third pivot which is below the first pivot, the second end portion of the second control rod being pivotally coupled to the first frame rail for pivoting about a fourth pivot;

a second suspension associated with the second end portion of the front axle and coupling the second end portion of the front axle to the second frame rail, the second suspension comprising a second leaf spring including a central portion overlying and pivotally coupled to the second end portion of the front axle for pivoting relative to the front axle about a second leaf spring pivot, the second leaf spring also including respective second forward and second rear leaf spring end portions coupled to the second frame rail, a third control rod having a first end portion pivotally coupled to the second end portion of the front axle for pivoting about a fifth pivot which is below the second leaf spring pivot, the third control rod having a second end portion pivotally coupled to the respective second frame rail for pivoting about a sixth pivot, and a fourth control rod having a first end portion pivotally coupled to the second end portion of the front axle for pivoting about a seventh pivot which is below the fifth pivot, the second end portion of the fourth control rod being pivotally coupled to the second frame rail for pivoting about an eighth pivot;

wherein the first suspension comprises a first axle mounting bracket having a first pivot pin receiving bore which is positioned above the first end portion of the front axle when the first axle mounting bracket is mounted to the first end portion of the front axle, the first pin receiving bore defining a transversely extending first leaf spring pivot, and wherein the second suspension comprises a second axle mounting bracket having a second pivot pin receiving bore which is positioned above the second end portion of the front axle when the second axle mounting bracket is mounted to the second end portion of the front axle, the second pin receiving bore defining a transversely extending second leaf spring pivot;

wherein the first axle mounting bracket comprises a first portion having a lower surface positioned at least in part over the first axle end portion and an upper surface supporting the first pivot pin receiving bore, the first axle mounting bracket also comprising first and second leg portions positioned forwardly of the front axle and carrying the first and third pivots;

wherein the second axle mounting bracket comprises a first portion having a lower surface positioned at least in part over the second axle end portion and an upper surface supporting the second pivot pin receiving bore, the second axle mounting bracket also comprising first and second leg portions positioned forwardly of the front axle and carrying the fifth and seventh pivots; and wherein the first suspension comprises a first leaf spring clamp comprising a first member having respective spaced apart first and second sets of downwardly projecting partial bore defining projections and plural second members each defining a portion of a leaf spring pivot pin receiving bore, the second members being mounted to the first member such that together the first and second members define first and second spaced apart bore sections, the first pivot pin receiving bore being sized and positioned for insertion between the first and second bore sections, a first leaf spring pivot pin inserted through the first bore section, through the first pin receiving bore and through the second bore section to pivotally couple the first and second members to the front axle mounting bracket and thereby to the front axle, a third clamping member coupled to the first member with a portion of the central portion of the first leaf spring between the first and third members;

wherein the second suspension comprises a second leaf spring clamp comprising a fourth member having respective spaced apart first and second sets of downwardly projecting partial bore defining projections and plural fifth members each defining a portion of a leaf spring pivot pin receiving bore, the fifth members being mounted to the fourth member such that together the fourth and fifth members define third and fourth spaced apart bore sections, the second pin receiving bore being sized and positioned for insertion between the third and fourth bore sections, a second leaf spring pivot pin inserted through the third bore section, through the second pin receiving bore and through the fourth bore section to pivotally couple the fourth and fifth members to the second axle mounting bracket and thereby to the front axle, a sixth clamping member coupled to the fourth member with a portion of the central portion of the leaf spring between the fourth and sixth members.

7. An apparatus according to claim 1 wherein the vehicle comprises first and second tandem axles extending in a transverse direction relative to the frame rails, the front axle comprising the first axle of the tandem axles and the second axle comprising a rear axle of the tandem axles, the rear axle having first and second axle end portions;

a third suspension associated with the first end portion of the rear axle and coupling the first end portion of the rear axle to the first frame rail, the third suspension comprising a third leaf spring including a central portion overlying and pivotally coupled to the first end portion of the rear axle for pivoting relative to the rear axle about a third leaf spring pivot, the third leaf spring also including respective third forward and third rear leaf spring end portions coupled to the first frame rail, a fifth control rod having a first end portion pivotally coupled to the first end portion of the rear axle for pivoting about a ninth pivot which is below the third leaf spring pivot, the fifth control rod having a second end portion pivotally coupled to the first frame rail for pivoting about a tenth pivot, and a sixth control rod having a first end portion pivotally coupled to the first end portion of the rear axle for pivoting about an eleventh pivot which is below the ninth pivot, the second end portion of the sixth control rod being pivotally coupled to the first frame rail for pivoting about a twelfth pivot;

a fourth suspension associated with the second end portion of the rear axle and coupling the second end portion of the rear axle to the second frame rail, the fourth suspension comprising a fourth leaf spring including a central portion overlying and pivotally coupled to the second end portion of the rear axle for pivoting relative to the rear axle about a fourth leaf spring pivot, the fourth leaf spring also including respective fourth forward and fourth rear leaf spring end portions coupled to the second frame rail, a seventh control rod having a first end portion pivotally coupled to the second end portion of the rear axle for pivoting about a thirteenth pivot which is below the fourth leaf spring pivot, the seventh control rod having a second end portion pivotally coupled to the respective second frame rail for pivoting about a fourteenth pivot, and an eighth control rod having a first end portion pivotally coupled to the second end portion of the rear axle for pivoting about a fifteenth pivot which is below the thirteenth pivot, the second end portion of the fourth control rod being pivotally coupled to the second frame rail for pivoting about a sixteenth pivot; and wherein the first and second pivots are positioned in a first line and the third and fourth pivots are positioned in a second line parallel to the first line, the fifth and sixth pivots being positioned in a third line and the seventh and eighth pivots being positioned in a fourth line parallel to the third line, the ninth and tenth pivots being positioned in a fifth line and the eleventh and twelfth pivots being positioned in a sixth line parallel to the fifth line; and the thirteenth and fourteenth pivots being positioned in a seventh line and the fifteenth and sixteenth pivots being positioned in an eighth line parallel to the seventh line.

8. A vehicle according to claim 7 wherein the first and fifth pivots are above a front wheel axis about which wheels supported by the front axle rotate and the third and seventh pivots are below the front wheel axis, and wherein the ninth and thirteenth pivots are above a rear wheel axis about which wheels supported by the rear axle rotate and the eleventh and fifteenth pivots are below the rear wheel axis.

9. A vehicle according to claim 7 wherein the first suspension comprises a first suspension bracket coupled to the first frame rail at a location forwardly of the front axle, the first suspension bracket extending downwardly from the first frame rail, and wherein the second and fourth pivots of the first suspension are carried by the first suspension bracket; and wherein the second suspension comprises a second suspension bracket coupled to the second frame rail at a location forwardly of the front axle, the second suspension bracket extending downwardly from the second frame rail, and wherein the sixth and eighth pivots of the second suspension are carried by the second suspension bracket.

10. A vehicle comprising:

first and second elongated spaced apart frame rails;

a front vehicle axle extending in a transverse direction relative to the frame rails, the front axle comprising first and second end portions;

a first suspension associated with the first end portion of the front axle and coupling the first end portion of the front axle to the first frame rail, the first suspension comprising a first leaf spring including a central portion overlying and pivotally coupled to the first end portion of the front axle for pivoting relative to the front axle about a first leaf spring pivot, the first leaf spring also including respective first forward and first rear leaf spring end portions coupled to the first frame rail, a first control rod having a first end portion pivotally coupled to the first end portion of the front axle for pivoting about a first pivot which is below the first leaf spring pivot, the first control rod having a second end portion pivotally coupled to the first frame rail for pivoting about a second pivot, and a second control rod having a first end portion pivotally coupled to the first end portion of the front axle for pivoting about a third pivot which is below the first pivot, the second end portion of the second control rod being pivotally coupled to the first frame rail for pivoting about a fourth pivot;

a second suspension associated with the second end portion of the front axle and coupling the second end portion of the front axle to the second frame rail, the second suspension comprising a second leaf spring including a central portion overlying and pivotally coupled to the second end portion of the front axle for pivoting relative to the front axle about a second leaf spring pivot, the second leaf spring also including respective second forward and second rear leaf spring end portions coupled to the second frame rail, a third control rod having a first end portion pivotally coupled to the second end portion of the front axle for pivoting about a fifth pivot which is below the second leaf spring pivot, the third control rod having a second end portion pivotally coupled to the respective second frame rail for pivoting about a sixth pivot, and a fourth control rod having a first end portion pivotally coupled to the second end portion of the front axle for pivoting about a seventh pivot which is below the fifth pivot, the second end portion of the fourth control rod being pivotally coupled to the second frame rail for pivoting about an eighth pivot;

wherein the vehicle comprises first and second tandem axles extending in a transverse direction relative to the frame rails, the front axle comprising the first axle of the tandem axles and the second axle comprising a rear axle of the tandem axles, the rear axle having first and second axle end portions;

a third suspension associated with the first end portion of the rear axle and coupling the first end portion of the rear axle to the first frame rail, the third suspension comprising a third leaf spring including a central portion overlying and pivotally coupled to the first end portion of the rear axle for pivoting relative to the rear axle about a third leaf spring pivot, the third leaf spring also including respective third forward and third rear leaf spring end portions coupled to the first frame rail, a fifth control rod having a first end portion pivotally coupled to the first end portion of the rear axle for pivoting about a ninth pivot which is below the third leaf spring pivot, the fifth control rod having a second end portion pivotally coupled to the first frame rail for pivoting about a tenth pivot, and a sixth control rod having a first end portion pivotally coupled to the first end portion of the rear axle for pivoting about an eleventh pivot which is below the ninth pivot, the second end portion of the sixth control rod being pivotally coupled to the first frame rail for pivoting about a twelfth pivot;

a fourth suspension associated with the second end portion of the rear axle and coupling the second end portion of the rear axle to the second frame rail, the fourth suspension comprising a fourth leaf spring including a central portion overlying and pivotally coupled to the second end portion of the rear axle for pivoting relative to the rear axle about a fourth leaf spring pivot, the fourth leaf spring also including respective fourth forward and fourth rear leaf spring end portions coupled to the second frame rail, a seventh control rod having a first end portion pivotally coupled to the second end portion of the rear axle for pivoting about a thirteenth pivot which is below the fourth leaf spring pivot, the seventh control rod having a second end portion pivotally coupled to the respective second frame rail for pivoting about a fourteenth pivot, and an eighth control rod having a first end portion pivotally coupled to the second end portion of the rear axle for pivoting about a fifteenth pivot which is below the thirteenth pivot, the second end portion of the fourth control rod being pivotally coupled to the second frame rail for pivoting about a sixteenth pivot;

wherein the first and second pivots are positioned in a first line and the third and fourth pivots are positioned in a second line parallel to the first line, the fifth and sixth pivots being positioned in a third line and the seventh and eighth pivots being positioned in a fourth line parallel to the third line, the ninth and tenth pivots being positioned in a fifth line and the eleventh and twelfth pivots being positioned in a sixth line parallel to the fifth line; and the thirteenth and fourteenth pivots being positioned in a seventh line and the fifteenth and sixteenth pivots being positioned in an eighth line parallel to the seventh line;

wherein the first suspension comprises a first suspension bracket coupled to the first frame rail at a location forwardly of the front axle, the first suspension bracket extending downwardly from the first frame rail, and wherein the second and fourth pivots of the first suspension are carried by the first suspension bracket;

wherein the second suspension comprises a second suspension bracket coupled to the second frame rail at a location forwardly of the front axle, the second suspension bracket extending downwardly from the second frame rail, and wherein the sixth and eighth pivots of the second suspension are carried by the second suspension bracket; and comprising a first intermediate bracket coupled to the first frame rail at a location rearwardly of the front axle and forwardly of the rear axle, the first intermediate bracket projecting downwardly from the first frame rail, a first tie member pivoted to the first intermediate bracket and having respective forward and rearward first tie member end portions, a first link pivoted to the first leaf spring rear end portion and to the forward end portion of the first tie member, a second link pivoted to the third leaf spring forward end portion and the rearward end portion of the first tie member, and wherein the apparatus further comprises a first rear bracket coupled to and projecting downwardly from the first frame rail at a location rearwardly of the rear axle, the third leaf spring rear end portion being coupled to the first rear bracket; and a second intermediate bracket coupled to the second frame rail at a location rearwardly of the front axle and forwardly of the rear axle, the second intermediate bracket projecting downwardly from the first frame rail, a second tie member pivoted to the second intermediate bracket and having respective forward and rearward end portions, a third link pivoted to the second leaf spring rear end portion and to the forward end portion of the second tie member, a fourth link pivoted to the fourth leaf spring forward end portion and to the rearward end portion of the second tie member, and wherein the apparatus further comprises a second rear bracket coupled to and projecting downwardly from the second frame rail at a location rearwardly of the rear axle, the fourth leaf spring rear end portion being coupled to the second rear bracket.

11. An apparatus according to claim 10 comprising a steering mechanism for steering the wheels of the tandem axles, the steering mechanism comprising first and second steering gears supported by an associated one of the first and second frame rails, a common mechanical coupling coupled to each of the steering gears and to a steering wheel of the vehicle whereby rotation of the steering wheel controls the operation of the first and second steering gears, first and second pitman arms, the first pitman arm being drivenly coupled to the first steering gear and the second pitman arm being drivenly connected to the second steering gear, first and second drag links each having respective first and second end portions, the first end portion of the first drag link being pivotally coupled to the first pitman arm and the first end portion of the second drag link being pivotally coupled to the second pitman arm, first and second steering arms coupled to the wheels to be steered, the second end portion of the first drag link being pivotally coupled to the first steering arm and the second end portion of the second drag link being pivotally coupled to the second steering arm, whereby rotation of the steering wheel in one direction drives the first and second steering gears to steer the wheels together.

12. An apparatus according to claim 11 wherein the mechanical coupling comprises a T-miter box.

13. An apparatus according to claim 12 in which the first and second steering gears comprise controlling steering gears, the apparatus further comprising first and second controlled steering gears coupled to the frame rail at the opposite side of the vehicle from the frame rail to which the first and second steering gears are mounted, a respective one of the first steering gears controlling the operation of a respective one of the controlled steering gears and the respective other of the first and second steering gears controlling the operation of the respective other of the controlled steering gears, each of the controlled steering gears being steerably connected to an associated steerable wheel of the vehicle such that the position of the controlled steering gear controls the steered position of the associated wheel.

14. A suspension for suspending one end portion of an axle from a frame rail comprising:
a first suspension associated with the first end portion of the front axle and coupling the first end portion of the front axle to the first frame rail, the first suspension comprising a first leaf spring including a central portion overlying and pivotally coupled to the first end portion of the front axle for pivoting relative to the axle about a first leaf spring pivot, the first leaf spring also including first forward and first rear leaf spring end portions coupled to the first frame rail, a first control rod having a first end portion pivotally coupled to the first end portion of the front axle for pivoting about a first pivot which is below the first leaf spring pivot, the first control rod having a second end portion pivotally coupled to the first frame rail for pivoting about a second pivot, and a second control rod having a first end portion pivotally coupled to the first end portion of the front axle for pivoting about a third pivot which is below the first pivot, the second end portion of the second control rod being pivotally coupled to the first frame rail for pivoting about a fourth pivot.

15. A vehicle suspension according to claim 14 wherein the first pivot is above a front wheel axis about which a wheel carried by the first end portion of the front axle rotates and the third pivot is below the front wheel axis.

16. A vehicle suspension for suspending end portions of at least one transversely extending front axle from first and second spaced apart frame rails, the front axle supporting wheels for rotation about a wheel axis, said suspension comprising:
a respective leaf spring associated with each axle end portion and pivotally supporting the associated axle end portion for pivoting about a leaf spring pivot and relative to the associated leaf spring, and respective sets of parallel first and second control rods, each set of control rods being associated with a respective one of the axle end portions, the first control rod of the set having an end portion pivotally coupled to the associated axle end portion at a location below the associated leaf spring pivot and below the wheel axis, the second control rod of the set having an end portion pivotally coupled to the associated axle end portion at a location below the associated leaf spring pivot and above the wheel axis.

17. A vehicle comprising:
first and second elongated spaced apart frame rails;
a front vehicle axle extending in a transverse direction relative to the frame rails, the front axle comprising first and second end portions;
a first suspension associated with the first end portion of the front axle and coupling the first end portion of the front axle to the first frame rail, the first suspension comprising a first leaf spring including a central portion overlying and pivotally coupled to the first end portion of the front axle for pivoting relative to the front axle about a first leaf spring pivot, the first leaf spring also including respective first forward and first rear leaf spring end portions coupled to the first frame rail, a first control rod having a first end portion pivotally coupled to the first end portion of the front axle for pivoting about a first pivot, the first control rod having a second end portion pivotally coupled to the first frame rail for pivoting about a second pivot, and a second control rod having a first end portion pivotally coupled to the first end portion of the front axle for pivoting about a third pivot which is below the first pivot, the second end portion of the second control rod being pivotally coupled to the first frame rail for pivoting about a fourth pivot;
a second suspension associated with the second end portion of the front axle and coupling the second end portion of the front axle to the second frame rail, the second suspension comprising a second leaf spring including a central portion overlying and pivotally coupled to the second end portion of the front axle for pivoting relative to the front axle about a second leaf spring pivot, the second leaf spring also including respective second forward and second rear leaf spring end portions coupled to the second frame rail, a third control rod having a first end portion pivotally coupled to the second end portion of the front axle for pivoting about a fifth pivot, the third control rod having a second end portion pivotally coupled to the respective second frame rail for pivoting about a sixth pivot, and a fourth control rod having a first end portion pivotally coupled to the second end portion of the front axle for pivoting about a seventh pivot which is below the fifth pivot, the second end portion of the fourth control rod being pivotally coupled to the second frame rail for pivoting about an eighth pivot;
wherein the vehicle comprises first and second tandem axles extending in a transverse direction relative to the frame rails, the front axle comprising the first axle of the tandem axles and the second axle comprising a rear axle of the tandem axles, the rear axle having first and second axle end portions;
a third suspension associated with the first end portion of the rear axle and coupling the first end portion of the rear axle to the first frame rail, the third suspension comprising a third leaf spring including a central portion overlying and pivotally coupled to the first end portion of the rear axle for pivoting relative to the rear axle about a third leaf spring pivot, the third leaf spring also including respective third forward and third rear leaf spring end portions coupled to the first frame rail, a fifth control rod having a first end portion pivotally coupled to the first end portion of the rear axle for pivoting about a ninth pivot, the fifth control rod having a second end portion pivotally coupled to the first frame rail for pivoting about a tenth pivot, and a sixth control rod having a first end portion pivotally coupled to the first end portion of the rear axle for pivoting about an eleventh pivot which is below the ninth pivot, the second end portion of the sixth control rod being pivotally coupled to the first frame rail for pivoting about a twelfth pivot;
a fourth suspension associated with the second end portion of the rear axle and coupling the second end portion of the rear axle to the second frame rail, the fourth suspension comprising a fourth leaf spring including a central portion overlying and pivotally coupled to the second end portion of the rear axle for pivoting relative to the rear axle about a fourth leaf spring pivot, the fourth leaf spring also including respective fourth forward and fourth rear leaf spring end portions coupled to the second frame rail, a seventh control rod having a first end portion pivotally coupled to the second end portion of the rear axle for pivoting about a thirteenth pivot, the seventh control rod having a second end portion pivotally coupled to the respective second frame rail for pivoting about a fourteenth pivot, and an eighth control rod having a first end portion pivotally coupled to the second end portion of the rear axle for pivoting about a fifteenth pivot which is below the thirteenth pivot, the second end portion of the fourth control rod being pivotally coupled to the second frame rail for pivoting about a sixteenth pivot;

wherein the first suspension comprises a first suspension bracket coupled to the first frame rail at a location forwardly of the front axle, the first suspension bracket extending downwardly from the first frame rail, and wherein the second and fourth pivots of the first suspension are carried by the first suspension bracket;

wherein the second suspension comprises a second suspension bracket coupled to the second frame rail at a location forwardly of the front axle, the second suspension bracket extending downwardly from the second frame rail, and wherein the sixth and eighth pivots of the second suspension are carried by the second suspension bracket; and comprising a first intermediate bracket coupled to the first frame rail at a location rearwardly of the front axle and forwardly of the rear axle, the first intermediate bracket projecting downwardly from the first frame rail, a first tie member pivoted to the first intermediate bracket and having respective forward and rearward first tie member end portions, a first link pivoted to the first leaf spring rear end portion and to the forward end portion of the first tie member, a second link pivoted to the third leaf spring forward end portion and the rearward end portion of the first tie member, and wherein the apparatus further comprises a first rear bracket coupled to and projecting downwardly from the first frame rail at a location rearwardly of the rear axle, the third leaf spring rear end portion being coupled to the first rear bracket; and a second intermediate bracket coupled to the second frame rail at a location rearwardly of the front axle and forwardly of the rear axle, the second intermediate bracket projecting downwardly from the first frame rail, a second tie member pivoted to the second intermediate bracket and having respective forward and rearward end portions, a third link pivoted to the second leaf spring rear end portion and to the forward end portion of the second tie member, a fourth link pivoted to the fourth leaf spring forward end portion and to the rearward end portion of the second tie member, and wherein the apparatus further comprises a second rear bracket coupled to and projecting downwardly from the second frame rail at a location rearwardly of the rear axle, the fourth leaf spring rear end portion being coupled to the second rear bracket.

* * * * *